(12) United States Patent
Bao et al.

(10) Patent No.: US 9,729,775 B2
(45) Date of Patent: Aug. 8, 2017

(54) AUTO-FOCUSING METHOD AND AUTO-FOCUSING DEVICE

(71) Applicant: Xiaomi Inc., Beijing (CN)

(72) Inventors: Xiehao Bao, Beijing (CN); Dongya Jiang, Beijing (CN); Wankun Yang, Beijing (CN)

(73) Assignee: Xiaomi Inc., Beijing (CN)

( * ) Notice: Subject to any disclaimer, the term of this patent is extended or adjusted under 35 U.S.C. 154(b) by 190 days.

(21) Appl. No.: 14/809,591

(22) Filed: Jul. 27, 2015

(65) Prior Publication Data

US 2016/0191783 A1    Jun. 30, 2016

Related U.S. Application Data

(63) Continuation of application No. PCT/CN2015/077963, filed on Apr. 30, 2015.

(30) Foreign Application Priority Data

Dec. 26, 2014 (CN) .......................... 2014 1 0832108

(51) Int. Cl.
*H04N 5/232* (2006.01)
*G03B 13/00* (2006.01)
(Continued)

(52) U.S. Cl.
CPC ......... *H04N 5/23212* (2013.01); *H04N 5/144* (2013.01); *H04N 5/23216* (2013.01); *H04N 5/23293* (2013.01)

(58) Field of Classification Search
CPC ............... H04N 5/144; H04N 5/23212; H04N 5/23216; H04N 5/23293; G06T 7/246
(Continued)

(56) References Cited

U.S. PATENT DOCUMENTS 6,968,094 B1 * 11/2005 Gallagher .............. G06K 9/209
348/E5.046
2002/0080257 A1    6/2002 Blank
(Continued)

FOREIGN PATENT DOCUMENTS

| CN | 1973231 A | 5/2007 |
|---|---|---|
| CN | 101410743 A | 4/2009 |

(Continued)

OTHER PUBLICATIONS

Office Action mailed Aug. 31, 2016, in counterpart Russian Application No. 2015129487(045538) and English translation thereof.
(Continued)

*Primary Examiner* — Chia-Wei A Chen
(74) *Attorney, Agent, or Firm* — Finnegan, Henderson, Farabow, Garrett & Dunner LLP

(57) ABSTRACT

An auto-focusing method for use in a device, includes: after performing a manual focusing on a target object through receiving a user operation on the target object in a viewfinder of the device, acquiring first spatial data of the target object; when detecting a change of contents of a view in the viewfinder, acquiring position variation data of the target object; acquiring second spatial data of the target object according to the first spatial data and the position variation data; and performing an auto-focusing on the target object according to the second spatial data.

17 Claims, 13 Drawing Sheets

(51) Int. Cl.
H04N 5/225 (2006.01)
H04N 5/14 (2006.01)

(58) Field of Classification Search
USPC .................. 348/169–172, 345, 349, 350
See application file for complete search history.

(56) References Cited

U.S. PATENT DOCUMENTS

| | | | |
|---|---|---|---|
| 2003/0103067 A1* | 6/2003 | Trell | G09B 23/20 |
| | | | 715/700 |
| 2004/0032649 A1* | 2/2004 | Kondo | G03B 35/00 |
| | | | 359/364 |
| 2004/0104996 A1* | 6/2004 | Hayashi | H04N 5/2259 |
| | | | 348/36 |
| 2005/0012745 A1* | 1/2005 | Kondo | G06T 3/0062 |
| | | | 345/427 |
| 2005/0226464 A1* | 10/2005 | Sun | G01S 3/7864 |
| | | | 382/103 |
| 2006/0239406 A1* | 10/2006 | Harding | G01V 5/0025 |
| | | | 378/86 |
| 2008/0218622 A1 | 9/2008 | Shinohara | |
| 2008/0225121 A1* | 9/2008 | Yoshida | G08B 13/19641 |
| | | | 348/159 |
| 2008/0226274 A1 | 9/2008 | Spielberg | |
| 2009/0051786 A1* | 2/2009 | Katsumata | H04N 5/23212 |
| | | | 348/231.99 |
| 2009/0303597 A1* | 12/2009 | Miyawaki | G02B 27/22 |
| | | | 359/559 |
| 2009/0324208 A1 | 12/2009 | Asano | |
| 2010/0020222 A1 | 1/2010 | Jones et al. | |
| 2010/0104139 A1* | 4/2010 | Kuehnle | G06K 9/00798 |
| | | | 382/106 |
| 2010/0141826 A1* | 6/2010 | Thorn | G03B 13/32 |
| | | | 348/345 |
| 2011/0063162 A1* | 3/2011 | Kojima | G01S 7/066 |
| | | | 342/164 |
| 2011/0063163 A1* | 3/2011 | Kojima | G01S 7/066 |
| | | | 342/179 |
| 2011/0080501 A1* | 4/2011 | Chen | H04N 5/23212 |
| | | | 348/231.3 |
| 2011/0261225 A1* | 10/2011 | Niinami | G06T 7/248 |
| | | | 348/223.1 |
| 2012/0147183 A1* | 6/2012 | Nishimura | G02B 13/06 |
| | | | 348/143 |
| 2014/0002618 A1* | 1/2014 | Nakagome | H04N 5/23212 |
| | | | 348/50 |
| 2014/0211045 A1* | 7/2014 | Tanaka | H04N 5/2621 |
| | | | 348/239 |
| 2014/0241587 A1* | 8/2014 | Jung | G06T 7/2086 |
| | | | 382/107 |
| 2014/0313339 A1 | 10/2014 | Diessner | |
| 2014/0375871 A1 | 12/2014 | Takagi | |
| 2015/0252938 A1* | 9/2015 | Suzuki | A61B 6/4283 |
| | | | 248/124.2 |
| 2016/0065944 A1* | 3/2016 | Fujii | B60R 1/00 |
| | | | 348/47 |
| 2016/0073006 A1* | 3/2016 | Funamoto | H04N 5/23212 |
| | | | 348/345 |
| 2016/0140391 A1* | 5/2016 | Kim | G06K 9/00624 |
| | | | 382/103 |
| 2016/0140713 A1* | 5/2016 | Martin | H04N 5/3572 |
| | | | 382/154 |
| 2016/0337665 A1* | 11/2016 | Yoo | H04N 13/00 |

FOREIGN PATENT DOCUMENTS

| | | |
|---|---|---|
| CN | 101762871 A | 6/2010 |
| CN | 103491305 A | 1/2014 |
| CN | 103699592 A | 4/2014 |
| CN | 103747183 A | 4/2014 |
| CN | 104243806 A | 12/2014 |
| CN | 104469167 A | 3/2015 |
| JP | 2000066086 A | 3/2000 |
| JP | 2001235675 A | 8/2001 |
| JP | 2002131624 A | 5/2002 |
| JP | 2005338352 A | 12/2005 |
| JP | 2010050603 A | 3/2010 |
| JP | 2011139379 A | 7/2011 |
| JP | 2012151526 A | 8/2012 |
| KR | 20070084515 A | 8/2007 |
| KR | 20130013678 A | 2/2013 |
| WO | WO 2008/026434 A1 | 3/2008 |
| WO | WO 2012/163393 A1 | 12/2012 |

OTHER PUBLICATIONS

Extended Search Report for European Application No. 15194854.4 from the European Patent Office, dated May 10, 2016.

English version of International Search Report of PCT/CN2015/077963, from the State Intellectual Property Office of China, mailed Sep. 25, 2015.

International Search Report of PCT/CN2015/077963, from the State Intellectual Property Office of China, mailed Sep. 25, 2015.

* cited by examiner

AUTO-FOCUSING METHOD AND AUTO-FOCUSING DEVICE

CROSS-REFERENCE TO RELATED APPLICATIONS

This application is a continuation of International Application No. PCT/CN2015/077963, filed Apr. 30, 2015, which is based upon and claims priority to Chinese Patent Application No. 201410832108.7, filed Dec. 26, 2014, the entire contents of all of which are incorporated herein by reference.

TECHNICAL FIELD

The present disclosure generally relates to the technical field of communication terminals and, more particularly, to an auto-focusing method and an auto-focusing device.

BACKGROUND

With the development of terminals, such as smart phones, various functions are implemented in the terminals. For example, a camera function may be integrated in a terminal, and a user may use the terminal to take pictures. When the camera function is enabled, the user, after finding a view through a viewfinder, may operate the terminal to perform a manual focusing on contents of the view through, e.g., tapping a target object in the viewfinder.

SUMMARY

According to a first aspect of the present disclosure, there is provided an auto-focusing method for use in a device, comprising: after performing a manual focusing on a target object through receiving a user operation on the target object in a viewfinder of the device, acquiring first spatial data of the target object; when detecting a change of contents of a view in the viewfinder, acquiring position variation data of the target object; acquiring second spatial data of the target object according to the first spatial data and the position variation data; and performing an auto-focusing on the target object according to the second spatial data.

According to a second aspect of the present disclosure, there is provided a device, comprising: a processor; and a memory for storing instructions executable by the processor; wherein the processor is configured to: after performing a manual focusing on a target object through receiving a user operation on the target object in a viewfinder of the device, acquire first spatial data of the target object; when detecting a change of contents of a view in the viewfinder, acquire position variation data of the target object; acquire second spatial data of the target object according to the first spatial data and the position variation data; and perform an auto-focusing on the target object according to the second spatial data.

According to a third aspect of the present disclosure, there is provided a non-transitory computer-readable storage medium having instructions stored therein that, when executed by a processor in a device, cause the device to perform an auto-focusing method, the method comprising: after performing a manual focusing on a target object through receiving a user operation on the target object in a viewfinder of the device, acquiring first spatial data of the target object; when detecting a change of contents of a view in the viewfinder, acquiring position variation data of the target object; acquiring second spatial data of the target object according to the first spatial data and the position variation data; and performing an auto-focusing on the target object according to the second spatial data.

It is to be understood that both the foregoing general description and the following detailed description are exemplary and explanatory only and are not restrictive of the present disclosure.

BRIEF DESCRIPTION OF THE DRAWINGS

The accompanying drawings, which are incorporated in and constitute a part of this specification, illustrate embodiments consistent with the invention and, together with the description, serve to explain the principles of the invention.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of devices and methods consistent with some aspects related to the invention as recited in the appended claims.

Figure 1:
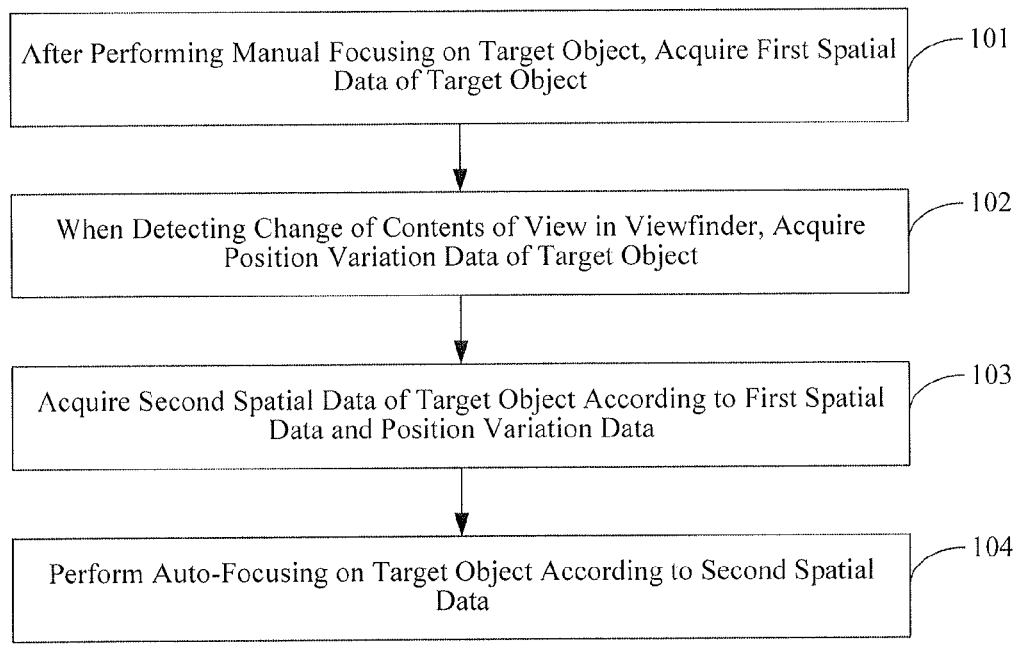
FIG. 1 is a flow chart of an auto-focusing method, according to an exemplary embodiment.

FIG. 1 is a flow chart of an auto-focusing method 100, according to an exemplary embodiment. For example, the method 100 may be used in a terminal. Referring to FIG. 1, the method 100 includes the following steps.

In step 101, after the terminal performs a manual focusing on a target object through receiving, e.g., a user tapping of the target object in a viewfinder, the terminal acquires first spatial data of the target object.

In exemplary embodiments, the terminal includes a camera function and may be, for example, a smartphone, a tablet computer, a personal digital assistant (PAD) and the like. A lens set provided in the terminal and configured to implement the camera function may adopt a fixed focal length (f), i.e., optical zooming may not be implemented in the terminal. During the process of focusing, the terminal changes a distance between the lens set and an image sensor for imaging through moving the lens set, to make the distance equal to an image distance (v). That is, a focal plane of the resulting image by the focusing coincides with a vertical plane of the image sensor to make the image clear. As a result, the focusing is finished.

In the embodiments, when the user enables the camera function of the terminal, the user may view contents of a view in the viewfinder to adjust what the user wants to photograph, and the manual focusing can be implemented by the user tapping the target object in the viewfinder. After the manual focusing is finished, an image of the target object is formed on the image sensor, and the image is clear. After the manual focusing, if the user moves the viewfinder to re-find a view, i.e., the contents of the view change, a position of the target object in the viewfinder will change, but the target object may not shift out of the viewfinder. To automatically focus on the target object under such condition, the terminal acquires the first spatial data of the target object after the manual focusing is finished. The first spatial data may include first spatial coordinates and first space vector angles. The first spatial data may be used to perform a subsequent auto-focusing process.

When the first spatial data of the target object is acquired, the terminal may firstly calculate a first perpendicular distance from a focal point to the image sensor, and establish a three-dimensional rectangular coordinate system with the focal point as an origin. Since the manual focusing has finished, the image of the target object is formed on the image sensor. Assuming that the image of the target object is located at a first position on the image sensor, first spatial coordinates of the first position in the three-dimensional rectangular coordinate system are acquired. The first spatial coordinates are composed of an X-axis coordinate, a Y-axis coordinate, and a Z-axis coordinate, and the Z-axis coordinate value is namely the first perpendicular distance noted above. Next, first space vector angles of a first vector between the focal point and the first position is calculated using, e.g., a vector angle formula in related arts on the basis of the three-dimensional rectangular coordinate system. The first space vector angles include an X-axis included angle between the first vector and the X-axis, a Y-axis included angle between the first vector and the Y-axis, and a Z-axis included angle between the first vector and the Z-axis.

In step 102, when detecting a change of contents of the view in the viewfinder, the terminal acquires position variation data of the target object.

In exemplary embodiments, the terminal includes one or more sensors, such as an acceleration sensor and/or a direction sensor. The acceleration sensor is configured to detect a magnitude and a direction of an acceleration of the terminal, thereby to judge whether the terminal is rotated. The direction sensor is configured to detect a moving angle of the terminal with respect to each coordinate axis of a three-dimensional space. For example, the direction sensor may be a gyroscope sensor.

In the embodiments, after the terminal acquires acceleration data through the acceleration sensor, whether the terminal is rotated may be determined according to the acceleration data, thereby to judge whether the viewfinder moves. If it is judged that the viewfinder moves, when the moving stops, vector angles of space variation detected by the direction sensor can be acquired. For example, the vector angles of space variation are variations of current space vector angles with respect to the space vector angles when the manual focusing is finished, including an X-axis variation angle with respect to the X-axis, a Y-axis variation angle with respect to the Y-axis, and a Z-axis variation angle with respect to the Z-axis.

In step 103, the terminal acquires second spatial data of the target object according to the first spatial data and the position variation data.

In the exemplary embodiment, the first spatial data, including the first space vector angles of the first vector between the focal point and the first position, is acquired in step 101, and the vector angles of space variation are acquired in step 102. Therefore, in step 103, second space vector angles may be calculated according to the first space vector angles and the vector angles of space variation, and the second space vector angles are space vector angles of a second vector between the focal point and a second position of the image of the target object on the image sensor after the auto-focusing is finished. An X-axis included angle in the second space vector angles is a sum of the X-axis included angle in the first space vector angles and the X-axis variation angle in the vector angles of space variation, a Y-axis included angle in the second space vector angles is a sum of the Y-axis included angle in the first space vector angles and the Y-axis variation angle in the vector angles of space variation, and a Z-axis included angle in the second space vector angles is a sum of the Z-axis included angle in the first space vector angles and the Z-axis variation angle in the vector angles of space variation. In step 101, the first spatial coordinates of the first position in the three-dimensional rectangular coordinate system are acquired. Therefore, in step 103, a first straight-line distance from the focal point to the first position may be calculated according to the first spatial coordinates, and second spatial coordinates of the second position may be further calculated according to the first straight-line distance and the acquired second space vector angles. An X-axis coordinate value in the second spatial coordinates is acquired through multiplying the first straight-line distance by the cosine value of the X-axis included angle of the second space vector angles, a Y-axis coordinate value in the second spatial coordinates is acquired through multiplying the first straight-line distance by the cosine value of the Y-axis included angle of the second space vector angles, and a Z-axis coordinate value in the second spatial coordinates is acquired through multiplying the first straight-line distance by the cosine value of the Z-axis included angle of the second space vector angles.

In step 104, the terminal performs an auto-focusing on the target object according to the second spatial data.

In the exemplary embodiment, after the second spatial data, including the second spatial coordinates, is acquired in step 103, a second perpendicular distance from the focal point to the second position may be acquired according to the second spatial coordinates, by determining the Z-axis coordinate value in the second spatial coordinates as the second perpendicular distance. A sum of the second perpendicular distance and the fixed focal length (0 is calculated as an adjusted image distance. Then, the terminal moves the lens set until the image of the target object formed is located on the image sensor when a distance from the lens set to the image sensor is the adjusted image distance. Accordingly, the image of the target object formed is clear, and the auto-focusing is finished.

In exemplary embodiments, before performing the auto-focusing according to the second spatial data, the second spatial data may also be corrected. For example, third spatial coordinates corresponding to the second position may be calculated through an image recognition algorithm, and the second spatial coordinates may be corrected according to the third spatial coordinates to acquire corrected second spatial coordinates.

During the process of correcting the second spatial coordinates, the terminal may judge whether a distance between the third spatial coordinates and the second spatial coordinates is less than a preset correction threshold. When the distance between the third spatial coordinates and the second spatial coordinates is less than the preset correction threshold, a mean value of the X-axis coordinate values in the third spatial coordinates and the second spatial coordinates is calculated as an X-axis coordinate value in the corrected second spatial coordinates, and a mean value of the Y-axis coordinate values in the third spatial coordinates and the second spatial coordinates is calculated as a Y-axis coordinate value in the corrected second spatial coordinates. Then, a Z-axis coordinate value in the corrected second spatial coordinates may be calculated according to the first straight-line distance, the X-axis coordinate value in the corrected second spatial coordinates, and the Y-axis coordinate value in the corrected second spatial coordinates. The corrected Z-axis coordinate value is namely the second perpendicular distance noted above. For example, if it is assumed that the first straight-line distance is L, the corrected X-axis coordinate value is a, the corrected Y-axis coordinate value is b and the corrected Z-axis coordinate value is c, then these values satisfy an equation: $L^2 = a^2 + b^2 + c^2$.

The method 100 simplifies the focusing operation, increases the focusing speed, and accordingly improves the picture taking experience of the user. Further, the auto-focusing accuracy can also be improved.

Figure 2:
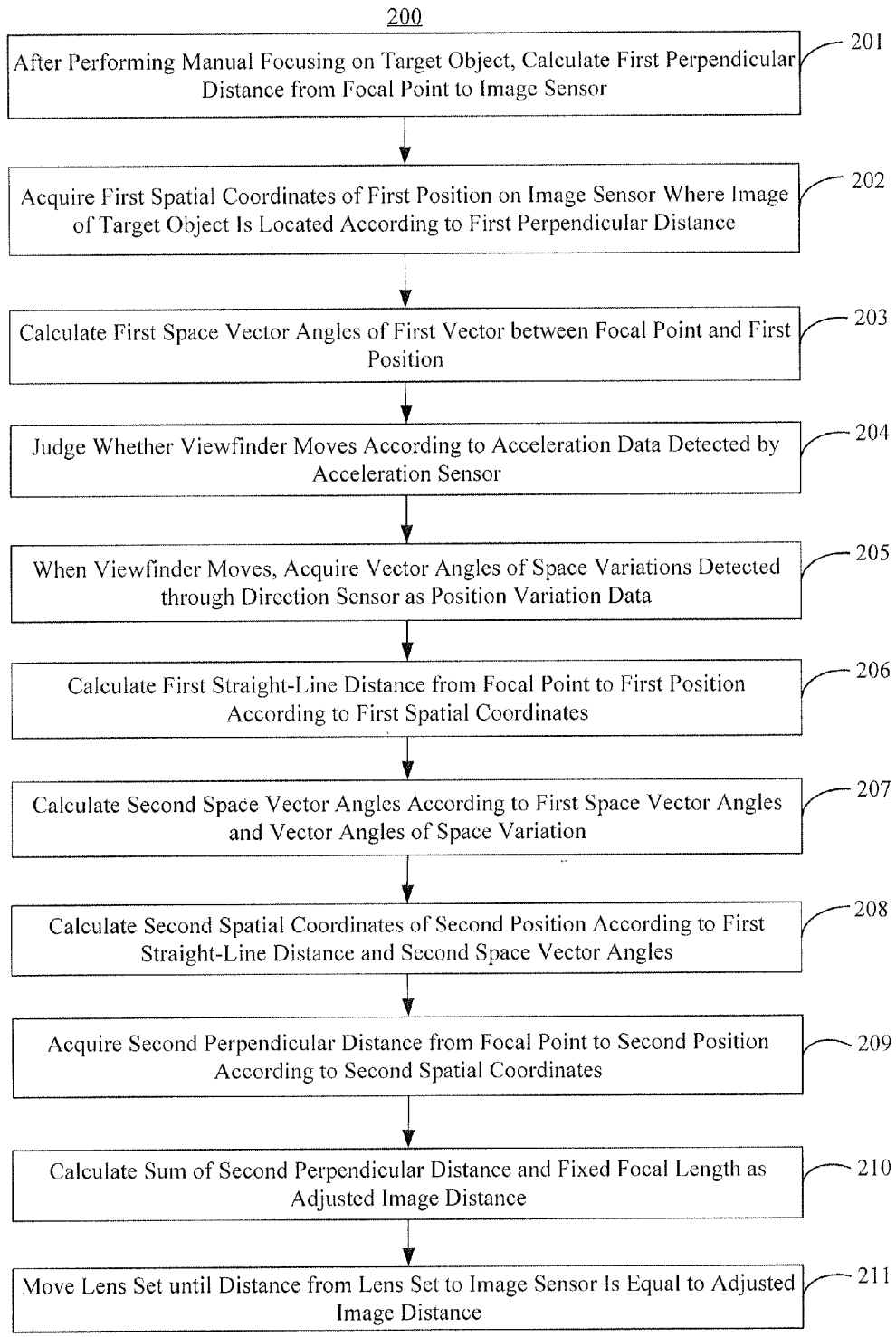
FIG. 2 is a flow chart of another auto-focusing method, according to an exemplary embodiment.

FIG. 2 is a flow chart of an auto-focusing method 200, according to an exemplary embodiment. For example, the method 200 may be used in a terminal. Referring to FIG. 2, the method 200 includes the following steps.

In step 201, after the terminal performs a manual focusing on a target object through receiving, e.g., a user tapping of the target object in a viewfinder, the terminal calculates a first perpendicular distance from a focal point to an image sensor of the terminal.

In exemplary embodiments, the terminal includes a camera function. During the process of imaging through a camera of the terminal, a focal length (f), an object distance (u), and an image distance (v) can satisfy a Gaussian imaging equation. For example, the focal length (f) is a distance between a lens set and the focal point, the object distance (u) is a distance from a vertical plane in which the target object is located to the lens set, and the image distance (v) is a distance from the image of the target object to the lens set. In some embodiments, the terminal may not implement optical zooming, and the lens set of the terminal adopts a fixed focal length f. Therefore, during the process of focusing, the terminal may change the distance between the lens set and the image sensor for imaging through moving the lens set, so that when the focusing is finished, the image distance is equal to v and the perpendicular distance from the focal point to the image sensor is d.

Figure 3:
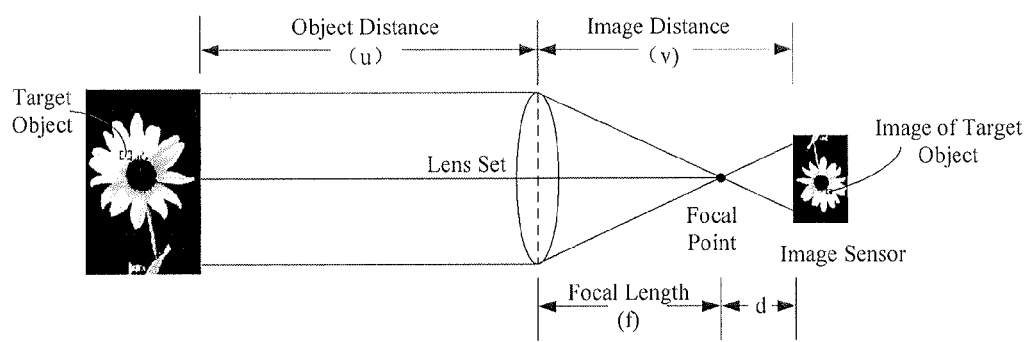
FIG. 3 is a schematic diagram showing imaging after completion of focusing by a terminal, according to an exemplary embodiment.

FIG. 3 is a schematic diagram showing imaging after completion of focusing by the terminal, according to an exemplary embodiment. In the embodiment, when a user enables the camera function of the terminal, the user may view contents of a view in the viewfinder to adjust what the user wants to photograph. Moreover, a manual focusing can be performed when the user taps a target object in the viewfinder. After the manual focusing is finished, a clear image of the target object is located on the image sensor. It is assumed that the image distance is v1 (i.e., v=v1 in FIG. 3) and the fixed focal length is f, then a first perpendicular distance from the focal point to the image sensor is d1 (i.e., d=d1 in FIG. 3), which can be calculated as follows:

$$d1 = v1 - f \quad \text{Equation (1).}$$

In step 202, with the focal point as an origin of a three-dimensional rectangular coordinate system, the terminal acquires first spatial coordinates of a first position on the image sensor where the image of the target object is located according to the first perpendicular distance.

In the embodiment, the center of the viewfinder may be taken as an origin of a rectangular plane coordinate system initially, wherein the center of the viewfinder and the focal point are along the same normal direction. Accordingly, first two-dimensional coordinates of the target object in the rectangular plane coordinate system are acquired, e.g., P (x, y), and the unit of the first two-dimensional coordinates is pixel (px). Then, a three-dimensional rectangular coordinate system is established with the focal point as the origin. Since the manual focusing has finished, the image of the target object is formed on the image sensor. If the image of the target object is formed at a first position P1 on the image sensor, first spatial coordinates of the first position P1 in the three-dimensional rectangular coordinate system are acquired. Accordingly, the first two-dimensional coordinates P (x, y) may be transformed according to a preset scale based on a size of the viewfinder and a size of the image sensor, to acquire second two-dimensional coordinates of the image of the target object on the image sensor, which are represented as (x1, y1). For example, when taking a picture with a length-to-width ratio of 4 to 3, a pixel size of the viewfinder is 1440*1080, a length and a width of the image sensor are 0.261 inch and 0.196 inch, respectively, and the first two-dimensional coordinates of the target object on the viewfinder are assumed to be P (500px, 500px). Then, the corresponding second two-dimensional coordinates in the three-dimensional rectangular coordinate system are (0.090 inch, 0.090 inch).

Further, the first spatial coordinates P1 (x1, y1, z1) of the image of the target object on the image sensor may be determined according to the second two-dimensional coordinates (x1, y1) and the first perpendicular distance d1. An X-axis coordinate value in the first spatial coordinates is the X-axis coordinate value x1 in the second two-dimensional coordinates, a Y-axis coordinate value of the first spatial coordinates is the Y-axis coordinate value y1 in the second two-dimensional coordinates, and a Z-axis coordinate value in the first spatial coordinates is the first perpendicular distance, i.e., z1=d1.

In step 203, the terminal calculates first space vector angles of a first vector between the focal point and the first position.

In the exemplary embodiment, after the manual focusing is finished and the first spatial coordinates of the first position are acquired, the terminal may calculate first space vector angles (∠x1, ∠y1, ∠z1) from the focal point to the first position P1 through a vector angle formula of the three-dimensional rectangular coordinate system. An X-axis included angle between the first vector and the X-axis is ∠x1, a Y-axis included angle between the first vector and the Y-axis is ∠y1, and a Z-axis included angle between the first vector and a Z-axis is ∠z1.

In step 204, the terminal judges whether the viewfinder moves according to acceleration data detected by an acceleration sensor.

In the exemplary embodiment, the terminal includes the acceleration sensor configured to detect a magnitude and a direction of an acceleration of the terminal. After the manual focusing is finished and the terminal acquires the acceleration data detected through the acceleration sensor, whether the terminal is rotated may be determined according to the acceleration data, thereby to judge whether the viewfinder moves.

In step 205, when the viewfinder moves, the terminal acquires vector angles of space variation detected through a direction sensor as position variation data.

In the exemplary embodiment, in addition to the acceleration sensor, the terminal includes the direction sensor configured to detect moving angles of the terminal with respect to each coordinate axis of a three-dimensional space. For example, the direction sensor may be a gyroscope sensor.

When it is judged according to the acceleration data that the viewfinder moves in step 204, the vector angles of space variation detected by the direction sensor can be acquired when the moving stops. The vector angles of space variation refer to variations of current space vector angles with respect to the space vector angles when the manual focusing is finished, including an X-axis variation angle $\angle\Delta x$ with respect to the X-axis, a Y-axis variation angle $\angle\Delta y$ with respect to the Y-axis, and a Z-axis variation angle $\angle\Delta z$ with respect to the Z-axis.

In step 206, the terminal calculates a first straight-line distance from the focal point to the first position according to the first spatial coordinates.

In the exemplary embodiment, the terminal calculates a first straight-line distance p from the focal point to the first position P1 according to the coordinates P1 (x1, y1, z1) acquired in the step 202, as follows:

$$\rho^2 = x1^2 + y1^2 + z1^2 \qquad \text{Equation (2)}.$$

In step 207, the terminal calculates second space vector angles according to the first space vector angles and the vector angles of space variation.

In the exemplary embodiment, the second space vector angles may be calculated according to the first space vector angles acquired in step 203 and the vector angles of space variation acquired in step 205. For example, the second space vector angles are space vector angles of a second vector between the focal point and a second position P2 of the image of the target object on the image sensor after the terminal finishes the auto-focusing, under a situation where after the manual focusing is finished, the contents of the view in the viewfinder change but the target object does not shift out of the viewfinder.

It is assumed that an X-axis included angle between the second vector and the X-axis is $\angle x2$, a Y-axis included angle between the second vector and the Y-axis is $\angle y2$, and a Z-axis included angle between the second vector and the Z-axis is $\angle z2$. Then, the second space vector angles can be calculated according to the following equations:

$$\angle x2 = \angle x1 + \angle \Delta x;$$

$$\angle y2 = \angle y1 + \angle \Delta y;$$

$$\angle z2 = \angle z1 + \angle \Delta z; \qquad \text{Equations (3)}.$$

In step 208, the terminal calculates second spatial coordinates of the second position according to the first straight-line distance and the second space vector angles.

In the exemplary embodiment, the second spatial coordinates P2 (x2, y2, z2) of the second position P2 may be calculated according to the first straight-line distance p acquired in step 206 and the second space vector angles ($\angle x2$, $\angle y2$, $\angle z2$) calculated in step 207. The X-axis coordinate value x2 of P2 is acquired through multiplying p by the cosine value of $\angle x2$, the Y-axis coordinate value y2 of P2 is acquired through multiplying p by the cosine value of $\angle y2$, and the Z-axis coordinate value z2 of P2 is acquired through multiplying p by the cosine value of $\angle z2$. That is, the second spatial coordinates can be calculated according to the following equations:

$$x2 = \rho \times \cos \angle x2;$$

$$y2 = \rho \times \cos \angle y2;$$

$$z2 = \rho \times \cos \angle z2; \qquad \text{Equations (4)}.$$

In step 209, the terminal acquires a second perpendicular distance from the focal point to the second position according to the second spatial coordinates, by determining the Z-axis coordinate value in the second spatial coordinates as the second perpendicular distance.

In the exemplary embodiment, the second spatial coordinates P2 (x2, y2, z2) of the second position P2 are acquired in step 208 and, therefore, the second perpendicular distance d2 from the focal point to the second position P2 may be acquired according to the second spatial coordinates, i.e., the second perpendicular distance d2 is determined to be the Z-axis coordinate value z2 in the second spatial coordinates.

In the exemplary embodiment, to realize the auto-focusing after the manual focusing, the second perpendicular distance d2 (i.e., z2) needs to be acquired. Therefore, only $z2 = \rho \times \cos \angle z2$ in Equations (4) may be calculated in step 208. Accordingly, the direction sensor may only acquire $\angle \Delta z$ in step 205, and only $z2 = \angle z1 + \angle \Delta z$ in step 207 may be calculated. Consequently, computational resources of the terminal can be saved.

In step 210, the terminal calculates a sum of the second perpendicular distance and the fixed focal length as an adjusted image distance.

In the exemplary embodiment, the terminal calculates an adjusted image distance v2 as follows:

$$v2 = d2 + f \qquad \text{Equation (5)}.$$

In step 211, the terminal moves the lens set until a distance from the lens set to the image sensor is equal to the adjusted image distance.

In the exemplary embodiment, when the focusing is finished, the distance between the lens set and the image sensor for imaging is equal to the image distance. Therefore, when the adjusted image distance is calculated according to the position of the image of the target object on the image sensor after the auto-focusing, the terminal may perform the auto-focusing through controlling the movement of the lens set. When the lens set moves to the position where the distance between the lens set and the image sensor is equal to the adjusted image distance v2, the auto-focusing is finished.

Figure 4:
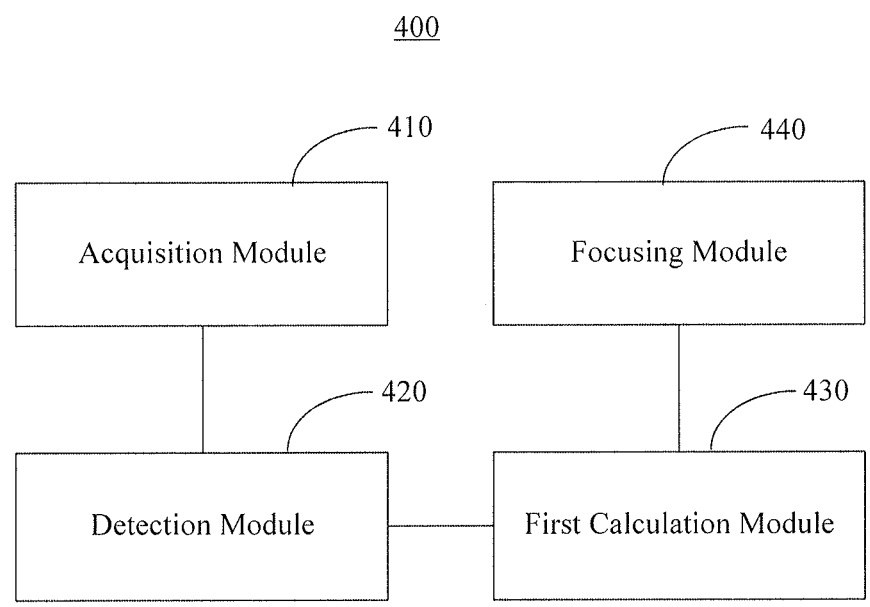
FIGS. 4-10 are block diagrams of an auto-focusing device, according to exemplary embodiments.

FIG. 4 is a block diagram of an auto-focusing device 400, according to an exemplary embodiment. As shown in FIG. 4, the device 400 includes an acquisition module 410, a detection module 420, a first calculation module 430, and a focusing module 440.

The acquisition module 410 is configured to, after a manual focusing is performed on a target object through receiving a user tapping of the target object in a viewfinder by a user, acquire first spatial data of the target object.

The detection module 420 is configured to, when detecting a change of contents of a view in the viewfinder change, acquire position variation data.

The first calculation module 430 is configured to calculate second spatial data of the target object according to the first spatial data and the position variation data.

The focusing module 440 is configured to perform an auto-focusing on the target object according to the second spatial data.

Figure 5:
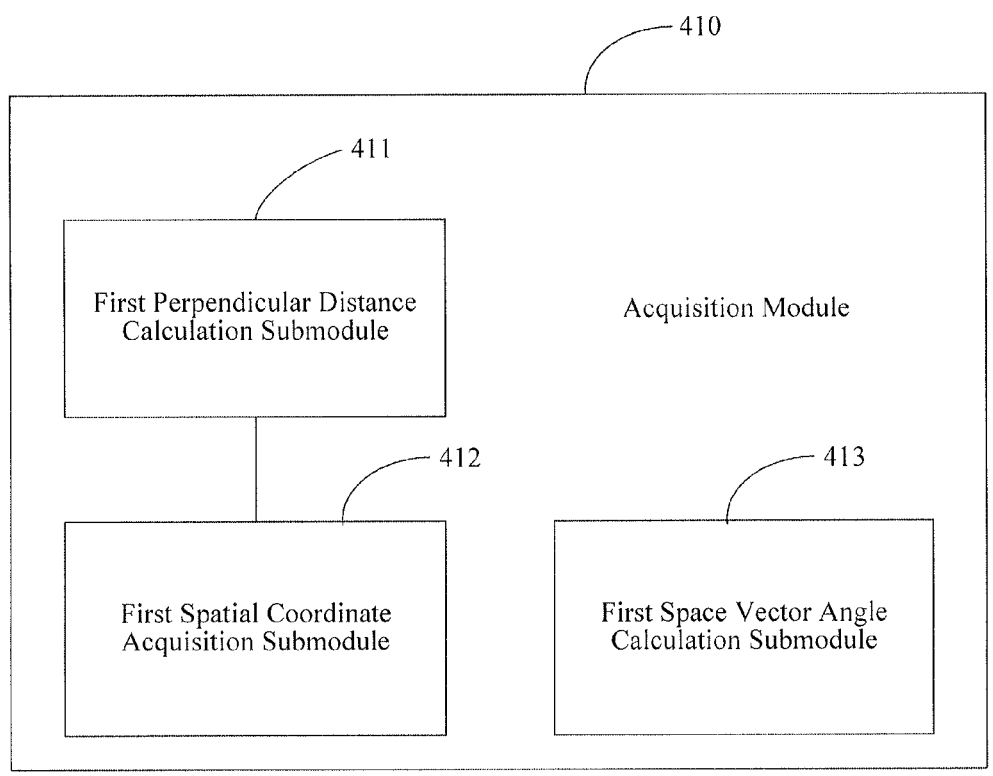

FIG. 5 is a block diagram of the acquisition module 410 (FIG. 4), according to an exemplary embodiment. As shown in FIG. 5, the acquisition module 410 may include a first perpendicular distance calculation submodule 411, a first spatial coordinate acquisition submodule 412, and a first space vector angle calculation submodule 413.

The first perpendicular distance calculation submodule 411 is configured to calculate a first perpendicular distance from a focal point to an image sensor, wherein an image of the target object is formed on the image sensor when the manual focusing is finished.

The first spatial coordinate acquisition submodule 412 is configured to acquire first spatial coordinates of a first position on the image sensor where the image of the target object is located according to the first perpendicular distance, with the focal point as an origin of a three-dimensional rectangular coordinate system.

The first space vector angle Calculation submodule 413 is configured to calculate first space vector angles of a first vector between the focal point and the first position.

Figure 6:
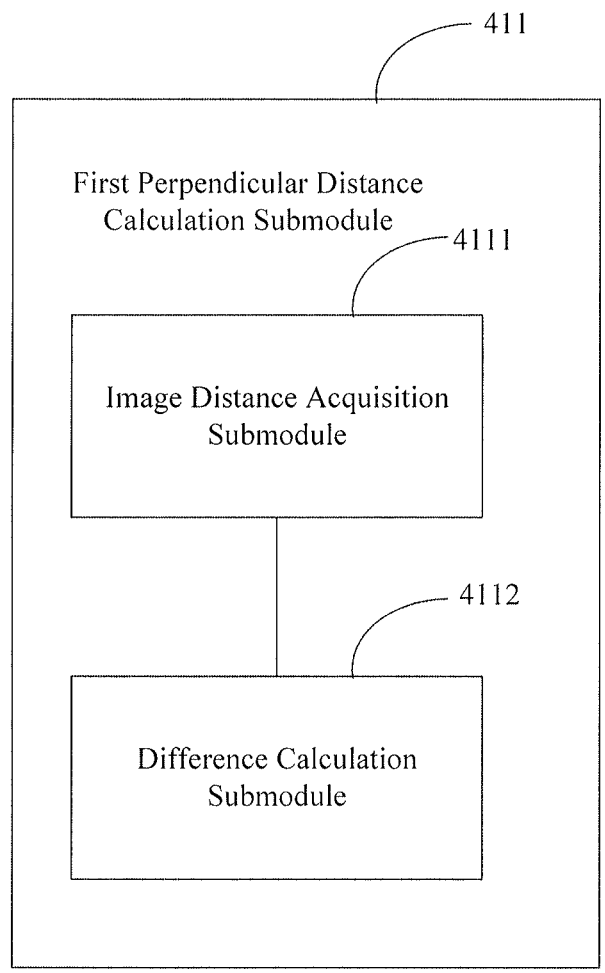

FIG. 6 is a block diagram of the first perpendicular distance calculation submodule 411 (FIG. 5), according to an exemplary embodiment. As shown in FIG. 6, the first perpendicular distance calculation submodule 411 may include an image distance acquisition submodule 4111 and a difference calculation submodule 4112.

The image distance acquisition submodule 4111 is configured to acquire an image distance when the manual focusing is finished.

The difference calculation submodule 4112 is configured to calculate a difference between the image distance and a fixed focal length as the first perpendicular distance from the focal point to the image sensor.

Figure 7:
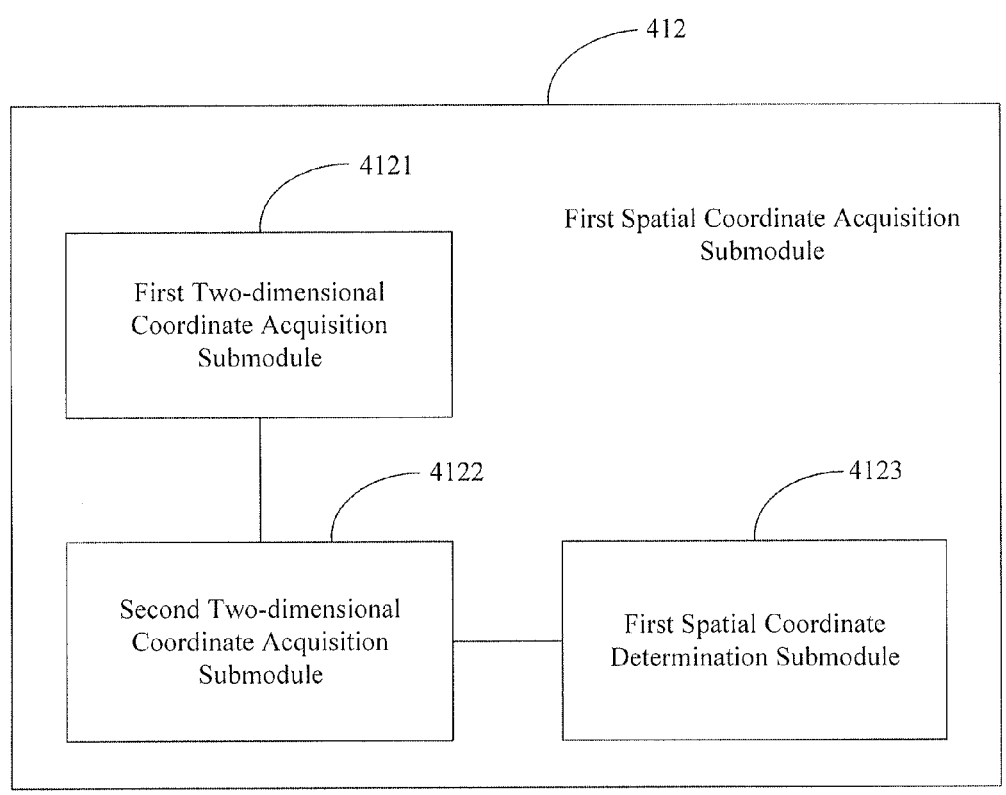

FIG. 7 is a block diagram of the first spatial coordinate acquisition submodule 412 (FIG. 5), according to an exemplary embodiment. As shown in FIG. 7, the first spatial coordinate acquisition submodule 412 may include a first two-dimensional coordinate acquisition submodule 4121, a second two-dimensional coordinate acquisition submodule 4122, and a first spatial coordinate determination submodule 4123.

The first two-dimensional coordinate acquisition submodule 4121 is configured to, using a center of the viewfinder as an origin of a rectangular plane coordinate system, acquire first two-dimensional coordinates of the target object in the rectangular plane coordinate system, wherein the center of the viewfinder and the focal point are in the same normal direction.

The second two-dimensional coordinate acquisition submodule 4122 is configured to transform the first two-dimensional coordinates according to a preset scale to acquire second two-dimensional coordinates of the image of the target object on the image sensor.

The first spatial coordinate determination submodule 4123 is configured to determine first spatial coordinates of the image of the target object on the image sensor according to the second two-dimensional coordinates and the first perpendicular distance, wherein an X-axis coordinate value in the first spatial coordinates is an X-axis coordinate value in the second two-dimensional coordinates, a Y-axis coordinate value in the first spatial coordinates is a Y-axis coordinate value in the second two-dimensional coordinates, and a Z-axis coordinate value in the first spatial coordinates is the first perpendicular distance.

Figure 8:
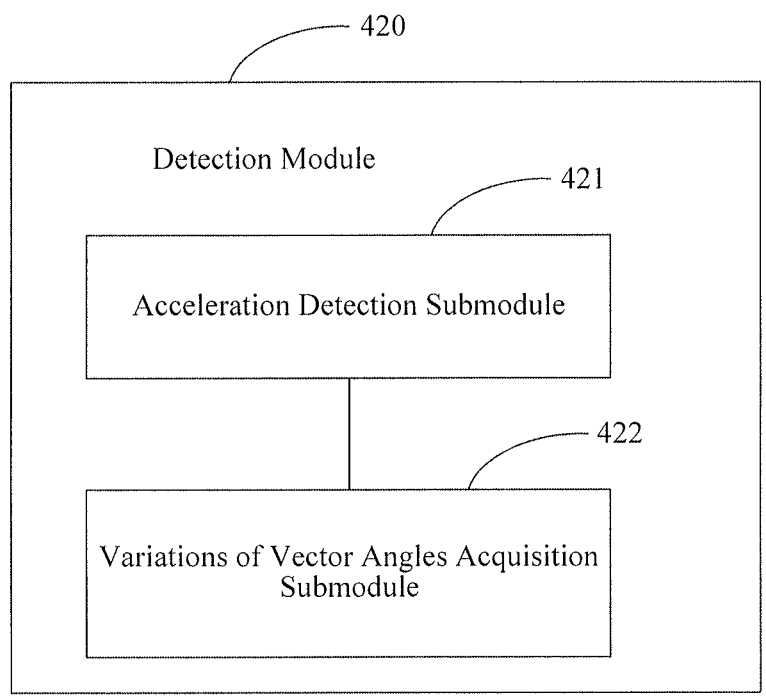

FIG. 8 is a block diagram of the detection module 420 (FIG. 4), according to an exemplary embodiment. As shown in FIG. 8, the detection module 420 may include an acceleration detection submodule 421 and a vector angle variation acquisition submodule 422.

The acceleration detection submodule 421 is configured to judge whether the viewfinder moves according to acceleration data detected by an acceleration sensor.

The vector angle variation acquisition submodule 422 is configured to, when the viewfinder moves, acquire one or more space variations of vector angles detected through a direction sensor as the position variation data.

Figure 9:
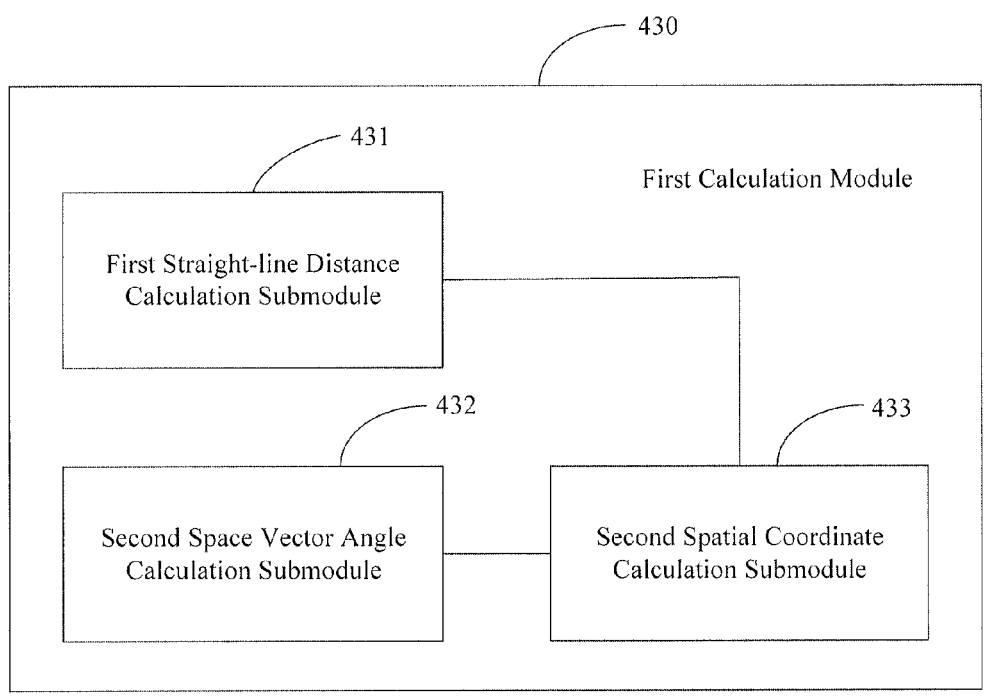

FIG. 9 is a block diagram of the first calculation module 430 (FIG. 4), according to an exemplary embodiment. As shown in FIG. 9, the first calculation module 430 may include a first straight-line distance calculation submodule 431, a second space vector angle calculation submodule 432, and a second spatial coordinate calculation submodule 433.

The first straight-line distance calculation submodule 431 is configured to calculate a first straight-line distance from the focal point to the first position according to the first spatial coordinates.

The second space vector angle calculation submodule 432 is configured to calculate one or more second space vector angles according to one or more of the first space vector angles and one or more of the space variations of vector angles, the one or more second space vector angles being one or more space vector angles of a second vector between the focal point and a second position, and the second position being a position of the image of the target object on the image sensor after the auto-focusing is finished.

The second spatial coordinate calculation submodule 433 is configured to calculate one or more second spatial coordinates of the second position according to the first straight-line distance and the one or more second space vector angles.

Figure 10:
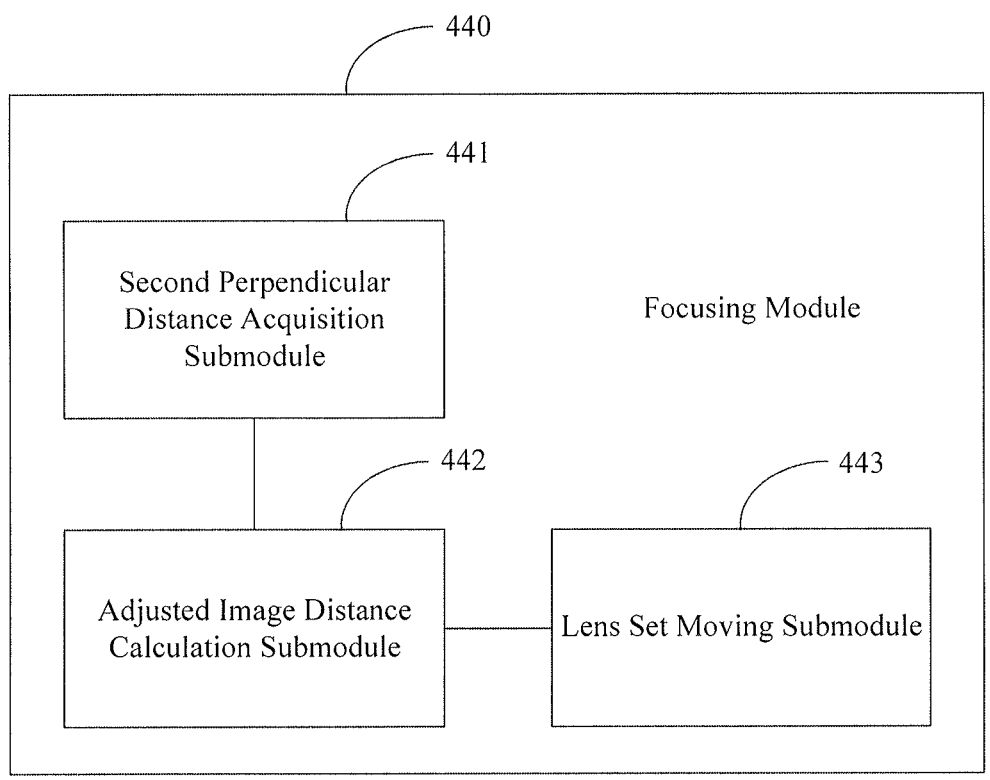

FIG. 10 is a block diagram of the focusing module 440 (FIG. 4), according to an exemplary embodiment. As shown in FIG. 10, the focusing module 440 may include a second perpendicular distance acquisition submodule 441, an adjusted image distance calculation submodule 442, and a lens set moving submodule 443.

The second perpendicular distance acquisition submodule 441 is configured to acquire a second perpendicular distance from the focal point to the second position according to the one or more second spatial coordinates, wherein the second perpendicular distance is a Z-axis coordinate value in the one or more second spatial coordinates.

The adjusted image distance calculation submodule 442 is configured to calculate a sum of the second perpendicular distance and the fixed focal length as an adjusted image distance.

The lens set moving submodule 443 is configured to move a lens set until a distance from the lens set to the image sensor is equal to the adjusted image distance.

Figure 11:
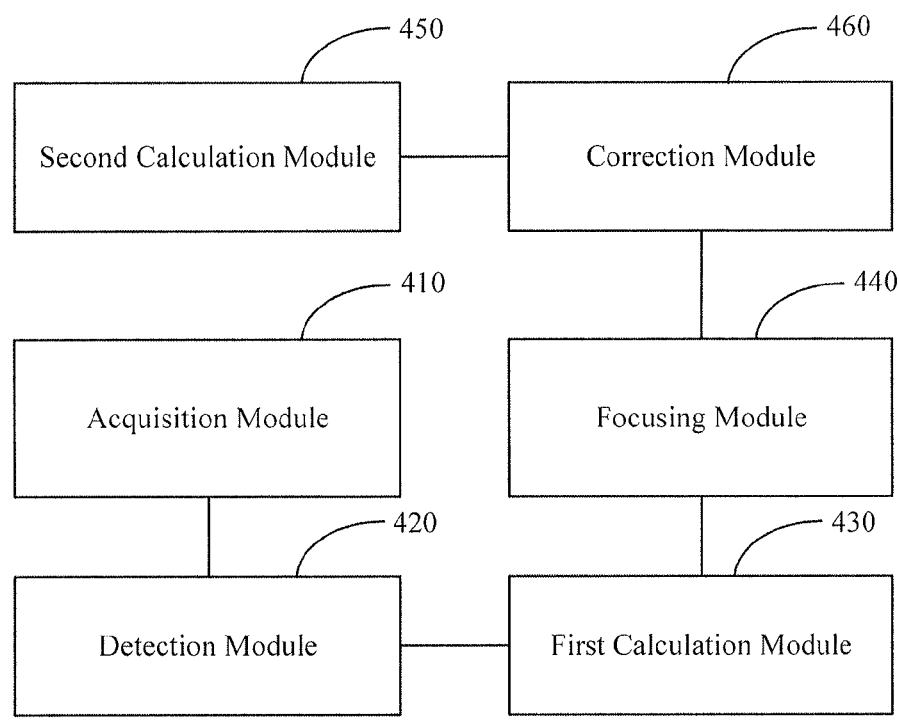
FIGS. 11 and 12 are block diagrams of an auto-focusing device, according to exemplary embodiments.

FIG. 11 is a block diagram of an auto-focusing device 1100, according to an exemplary embodiment. As shown in FIG. 11, the device 1100 may further include a second calculation module 450 and a correction module 460, in addition to the acquisition module 410, the detection module 420, the first calculation module 430, and the focusing module 440 (FIG. 4).

The second calculation module 450 is configured to calculate third spatial coordinates corresponding to the second position through an image recognition algorithm.

The correction module 460 is configured to correct the second spatial coordinates according to the third spatial coordinates to acquire corrected second spatial coordinates.

Figure 12:
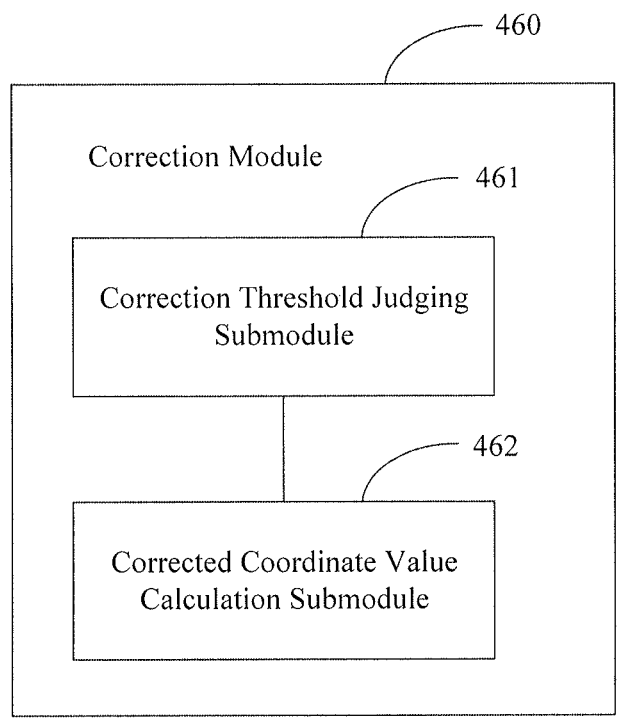

FIG. 12 is a block diagram of the correction module 460 (FIG. 11), according to an exemplary embodiment. As shown in FIG. 12, the correction module 460 may include a correction threshold judging submodule 461 and a corrected coordinate value calculation submodule 462.

The correction threshold judging submodule 461 is configured to judge whether a distance between the third spatial coordinates and the second spatial coordinates is less than a preset correction threshold.

The corrected coordinate value calculation submodule 462 is configured to, when the distance between the third spatial coordinates and the second spatial coordinates is less than the preset correction threshold, calculate a mean value of the X-axis coordinate values in the third spatial coordinates and the second spatial coordinates as an X-axis coordinate value in the corrected second spatial coordinates, calculate a mean value of the Y-axis coordinate values in the third spatial coordinates and the second spatial coordinates as a Y-axis coordinate value in the corrected second spatial coordinates, and calculate the Z-axis coordinate value in the corrected second spatial coordinates according to the first straight-line distance, the X-axis coordinate value in the corrected second spatial coordinates, and the Y-axis coordinate value in the corrected second spatial coordinates.

Figure 13:
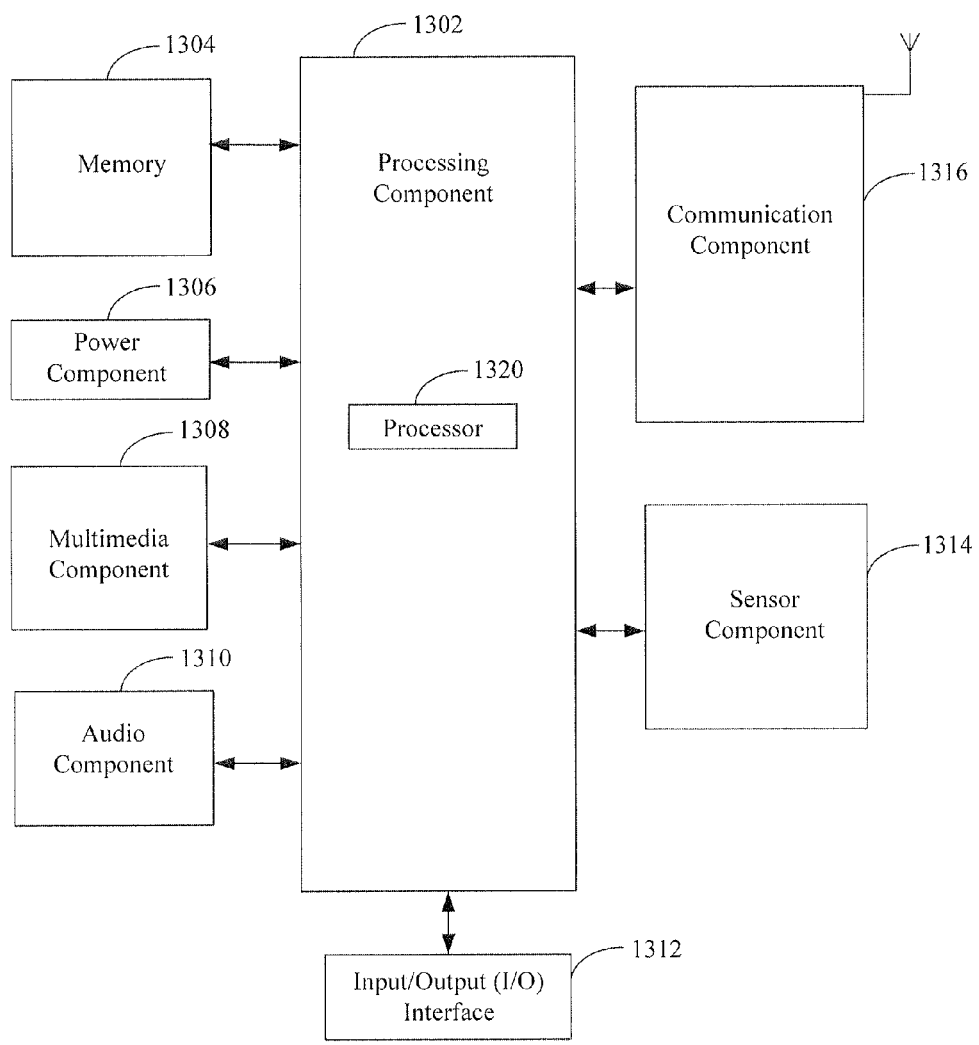
FIG. 13 is a block diagram of a device, according to an exemplary embodiment.

FIG. 13 is a block diagram of a device 1300, according to an exemplary embodiment. For example, the device 1300 may be the above described terminal, such as a mobile phone, a computer, a digital broadcast terminal, a messaging device, a gaming console, a tablet, a medical device, exercise equipment, a personal digital assistant, and the like.

Referring to FIG. 13, the device 1300 may include one or more of the following components: a processing component 1302, a memory 1304, a power component 1306, a multimedia component 1308, an audio component 1310, an input/output (I/O) interface 1312, a sensor component 1314, and a communication component 1316.

The processing component 1302 typically controls overall operations of the device 1300, such as the operations associated with display, telephone calls, data communications, camera operations, and recording operations. The processing component 1302 may include one or more processors 1320 to execute instructions to perform all or part of the steps in the above described methods. Moreover, the processing component 1302 may include one or more modules which facilitate the interaction between the processing component 1302 and other components. For instance, the processing component 1302 may include a multimedia module to facilitate the interaction between the multimedia component 1308 and the processing component 1302.

The memory 1304 is configured to store various types of data to support the operation of the device 1300. Examples of such data include instructions for any applications or methods operated on the device 1300, contact data, phonebook data, messages, pictures, video, etc. The memory 1304 may be implemented using any type of volatile or non-volatile Memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 1306 provides power to various components of the device 1300. The power component 1306 may include a power management system, one or more power sources, and any other components associated with the generation, management, and distribution of power in the device 1300.

The multimedia component 1308 includes a screen providing an output interface between the device 1300 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 1308 includes a front camera and/or a rear camera. The front camera and/or the rear camera may receive an external multimedia datum while the device 1300 is in an operation mode, such as a photographing mode or a video mode. Each of the front camera and the rear camera may be a fixed optical lens system or have focus and optical zoom capability.

The audio component 1310 is configured to output and/or input audio signals. For example, the audio component 1310 includes a microphone configured to receive an external audio signal when the device 1300 is in an operation mode, such as a call mode, a recording mode, and a voice recognition mode. The received audio signal may be further stored in the memory 1304 or transmitted via the communication component 1316. In some embodiments, the audio component 1310 further includes a speaker to output audio signals.

The I/O interface 1312 provides an interface between the processing component 1302 and peripheral interface modules, such as a keyboard, a tap wheel, buttons, and the like. The buttons may include, but are not limited to, a home button, a volume button, a starting button, and a locking button.

The sensor component 1314 includes one or more sensors to provide status assessments of various aspects of the device 1300. For instance, the sensor component 1314 may detect an open/closed status of the device 1300, relative positioning of components, e.g., the display and the keypad, of the device 1300, a change in position of the device 1300 or a component of the device 1300, a presence or absence of user contact with the device 1300, an orientation or an acceleration/deceleration of the device 1300, and a change in temperature of the device 1300. The sensor component 1314 may include a proximity sensor configured to detect the presence of nearby objects without any physical contact. The sensor component 1314 may also include a light sensor, such as a CMOS or CCD image sensor, for use in imaging applications. In some embodiments, the sensor component 1314 may also include an accelerometer sensor, a gyroscope sensor, a magnetic sensor, a microwave sensor, or a temperature sensor.

The communication component 1316 is configured to facilitate communication, wired or wirelessly, between the device 1300 and other devices. The device 1300 can access a wireless network based on a communication standard, such as WiFi, 2G, or 3G, or a combination thereof. In one exemplary embodiment, the communication component 1316 receives a broadcast signal or broadcast associated information from an external broadcast management system via a broadcast channel. In one exemplary embodiment, the communication component 1316 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the device 1300 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In exemplary embodiments, there is also provided a non-transitory computer readable storage medium including instructions, such as included in the memory 1304, executable by the processor 1320 in the device 1300, for performing the above-described methods. For example, the non-transitory computer-readable storage medium may be a ROM, a RAM, a CD-ROM, a magnetic tape, a floppy disc, an optical data storage device, and the like.

One of ordinary skill in the art will understand that the above described modules can each be implemented by hardware, or software, or a combination of hardware and software. One of ordinary skill in the art will also understand that multiple ones of the above described modules may be combined as one module, and each of the above described modules may be further divided into a plurality of sub-modules.

Other embodiments of the invention will be apparent to those skilled in the art from consideration of the specification and practice of the invention disclosed here. The present invention is intended to cover any variations, uses, or adaptations of the invention following the general principles thereof and including such departures from the present invention as come within known or customary practice in the art. It is intended that the specification and examples be considered as exemplary only, with a true scope and spirit of the invention being indicated by the following claims.

It will be appreciated that the present invention is not limited to the exact construction that has been described above and illustrated in the accompanying drawings, and that various modifications and changes can be made without departing from the scope thereof. It is intended that the scope of the invention should only be limited by the appended claims.

What is claimed is:

1. An auto-focusing method for use in a device, comprising:
    after performing a manual focusing on a target object through receiving a user operation on the target object in a viewfinder of the device, acquiring first spatial data of the target object;
    when detecting a change of contents of a view in the viewfinder, acquiring position variation data of the target object;
    acquiring second spatial data of the target object according to the first spatial data and the position variation data; and
    performing an auto-focusing on the target object according to the second spatial data;
    wherein the acquiring of the first spatial data of the target object includes:
    calculating a first perpendicular distance from a focal point to an image sensor, wherein an image of the target object is formed on the image sensor when the manual focusing is finished;
    acquiring first spatial coordinates of a first position on the image sensor where the image of the target object is located according to the first perpendicular distance, with the focal point as an origin of a three-dimensional rectangular coordinate system; and
    calculating first space vector angles of a first vector between the focal point and the first position.

2. The method according to claim 1, wherein the calculating of the first perpendicular distance from the focal point to the image sensor comprises:
    acquiring an image distance when the manual focusing is finished; and calculating a difference between the image distance and a fixed focal length as the first perpendicular distance from the focal point to the image sensor.

3. The method according to claim 1, wherein the acquiring of the first spatial coordinates of the first position on the image sensor comprises:
    with a center of the viewfinder as an origin of a rectangular plane coordinate system, acquiring first two-dimensional coordinates of the target object in the rectangular plane coordinate system, wherein the center of the viewfinder and the focal point are in a same normal direction;
    transforming the first two-dimensional coordinates according to a preset scale to acquire second two-dimensional coordinates of the image of the target object on the image sensor; and
    determining the first spatial coordinates of the first position on the image sensor according to the second two-dimensional coordinates and the first perpendicular distance, wherein an X-axis coordinate value in the first spatial coordinates is an X-axis coordinate value in the second two-dimensional coordinates, a Y-axis coordinate value in the first spatial coordinates is a Y-axis coordinate value in the second two-dimensional coordinates, and a Z-axis coordinate value in the first spatial coordinates is the first perpendicular distance.

4. The method according to claim 1, wherein the acquiring of the position variation data when detecting the change of the contents of the view in the viewfinder comprises:
    judging whether the viewfinder moves according to acceleration data detected by an acceleration sensor; and
    when the viewfinder moves, acquiring one or more vector angles of space variation detected through a direction sensor, as the position variation data.

5. The method according to claim 4, wherein the acquiring of the second spatial data of the target object according to the first spatial data and the position variation data comprises:
    calculating a first straight-line distance from the focal point to the first position according to the first spatial coordinates;
    calculating one or more second space vector angles according to one or more of the first space vector angles and one or more of the vector angles of space variation, the one or more second space vector angles being one or more space vector angles of a second vector between the focal point and a second position, and the second position being a position of the image of the target object on the image sensor after the auto-focusing; and
    calculating one or more second spatial coordinates of the second position according to the first straight-line distance and the one or more second space vector angles.

6. The method according to claim 5, wherein the performing of the auto-focusing on the target object according to the second spatial data comprises:
    acquiring a second perpendicular distance from the focal point to the second position according to the one or more second spatial coordinates, wherein the second perpendicular distance is a Z-axis coordinate value in the one or more second spatial coordinates;
    calculating a sum of the second perpendicular distance and a fixed focal length as an adjusted image distance; and moving a lens set until a distance from the lens set to the image sensor is equal to the adjusted image distance.

7. The method according to claim 5, wherein before the performing of the auto-focusing on the target object according to the second spatial data, the method further comprises:
calculating third spatial coordinates corresponding to the second position through an image recognition algorithm; and
correcting the second spatial coordinates according to the third spatial coordinates to acquire corrected second spatial coordinates.

8. The method according to claim 7, wherein the correcting of the second spatial coordinates comprises:
judging whether a distance between the third spatial coordinates and the second spatial coordinates is less than a preset correction threshold; and
when the distance between the third spatial coordinates and the second spatial coordinates is less than the preset correction threshold, calculating a mean value of X-axis coordinate values in the third spatial coordinates and the second spatial coordinates as an X-axis coordinate value in the corrected second spatial coordinates, and calculating a mean value of Y-axis coordinate values in the third spatial coordinates and the second spatial coordinates as a Y-axis coordinate value in the corrected second spatial coordinates; and
calculating a Z-axis coordinate value in the corrected second spatial coordinates according to the first straight-line distance, the X-axis coordinate value in the corrected second spatial coordinates, and the Y-axis coordinate value in the corrected second spatial coordinates.

9. A device, comprising:
a processor; and
a memory for storing instructions executable by the processor;
wherein the processor is configured to:
after performing a manual focusing on a target object through receiving a user operation on the target object in a viewfinder of the device, acquire first spatial data of the target object;
when detecting a change of contents of a view in the viewfinder, acquire position variation data of the target object;
acquire second spatial data of the target object according to the first spatial data and the position variation data; and
perform an auto-focusing on the target object according to the second spatial data;
wherein, in acquiring the first spatial data of the target object, the processor is further configured to:
calculate a first perpendicular distance from a focal point to an image sensor, wherein an image of the target object is formed on the image sensor when the manual focusing is finished;
acquire first spatial coordinates of a first position on the image sensor where the image of the target object is located according to the first perpendicular distance, with the focal point as an origin of a three-dimensional rectangular coordinate system; and
calculate first space vector angles of a first vector between the focal point and the first position.

10. The device according to claim 9, wherein the processor is further configured to: acquire an image distance when the manual focusing is finished; and calculate a difference between the image distance and a fixed focal length as the first perpendicular distance from the focal point to the image sensor.

11. The device according to claim 10, wherein the processor is further configured to:
with a center of the viewfinder as an origin of a rectangular plane coordinate system, acquire first two-dimensional coordinates of the target object in the rectangular plane coordinate system, wherein the center of the viewfinder and the focal point are in a same normal direction;
transform the first two-dimensional coordinates according to a preset scale to acquire second two-dimensional coordinates of the image of the target object on the image sensor; and
determine the first spatial coordinates of the first position on the image sensor according to the second two-dimensional coordinates and the first perpendicular distance, wherein an X-axis coordinate value in the first spatial coordinates is an X-axis coordinate value in the second two-dimensional coordinates, a Y-axis coordinate value in the first spatial coordinates is a Y-axis coordinate value in the second two-dimensional coordinates, and a Z-axis coordinate value in the first spatial coordinates is the first perpendicular distance.

12. The device according to claim 10, wherein the processor is further configured to:
judge whether the viewfinder moves according to acceleration data detected by an acceleration sensor; and
when the viewfinder moves, acquire one or more vector angles of space variation detected through a direction sensor, as the position variation data.

13. The device according to claim 12, wherein the processor is further configured to:
calculate a first straight-line distance from the focal point to the first position according to the first spatial coordinates;
calculate one or more second space vector angles according to one or more of the first space vector angles and one or more of the vector angles of space variation, the one or more second space vector angles being one or more space vector angles of a second vector between the focal point and a second position, and the second position being a position of the image of the target object on the image sensor after the auto-focusing; and
calculate one or more second spatial coordinates of the second position according to the first straight-line distance and the one or more second space vector angles.

14. The device according to 13, wherein the processor is further configured to:
acquire a second perpendicular distance from the focal point to the second position according to the one or more second spatial coordinates, wherein the second perpendicular distance is a Z-axis coordinate value in the one or more second spatial coordinates;
calculate a sum of the second perpendicular distance and a fixed focal length as an adjusted image distance; and
move a lens set until a distance from the lens set to the image sensor is equal to the adjusted image distance.

15. The device according to claim 13, wherein before the performing of the auto-focusing on the target object according to the second spatial data, the processor is further configured to:
calculate third spatial coordinates corresponding to the second position through an image recognition algorithm; and correct the second spatial coordinates according to the third spatial coordinates to acquire corrected second spatial coordinates.

16. The device according to claim 15, wherein the processor is further configured to:
   judge whether a distance between the third spatial coordinates and the second spatial coordinates is less than a preset correction threshold;
   when the distance between the third spatial coordinates and the second spatial coordinates is less than the preset correction threshold, calculate a mean value of X-axis coordinate values in the third spatial coordinates and the second spatial coordinates as an X-axis coordinate value in the corrected second spatial coordinates, calculate a mean value of Y-axis coordinate values in the third spatial coordinates and the second spatial coordinates as a Y-axis coordinate value in the corrected second spatial coordinates; and
   calculate a Z-axis coordinate value in the corrected second spatial coordinates according to the first straight-line distance, the X-axis coordinate value in the corrected second spatial coordinates, and the Y-axis coordinate value in the corrected second spatial coordinates.

17. A non-transitory computer-readable storage medium having instructions stored therein that, when executed by a processor in a device, cause the device to perform an auto-focusing method, the method comprising:
   after performing a manual focusing on a target object through receiving a user operation on the target object in a viewfinder of the device, acquiring first spatial data of the target object;
   when detecting a change of contents of a view in the viewfinder, acquiring position variation data of the target object;
   acquiring second spatial data of the target object according to the first spatial data and the position variation data; and
   performing an auto-focusing on the target object according to the second spatial data;
   wherein the acquiring of the first spatial data of the target object includes:
   calculating a first perpendicular distance from a focal point to an image sensor, wherein an image of the target object is formed on the image sensor when the manual focusing is finished;
   acquiring first spatial coordinates of a first position on the image sensor where the image of the target object is located according to the first perpendicular distance, with the focal point as an origin of a three-dimensional rectangular coordinate system; and
   calculating first space vector angles of a first vector between the focal point and the first position.

* * * * *